United States Patent [19]

Gray

[11] 4,455,717

[45] Jun. 26, 1984

[54] ROPE CLAMPING DEVICE

[76] Inventor: Robert C. Gray, P.O. Box 15262, Tulsa, Okla. 74112

[21] Appl. No.: 421,569

[22] Filed: Sep. 22, 1982

[51] Int. Cl.³ .............................................. F16G 11/00
[52] U.S. Cl. ................................ 24/115 R; 24/115 M; 24/136 R
[58] Field of Search ............ 24/115 R, 115 M, 115 L, 24/265 EE, 132 R, 136 R

[56] References Cited

U.S. PATENT DOCUMENTS

| 680,481 | 8/1901 | Furman | 24/136 R |
|---|---|---|---|
| 992,821 | 5/1911 | Stewart | 24/115 M |
| 1,258,580 | 3/1918 | Lassiter | 24/136 R |
| 1,413,690 | 4/1922 | Slocum | 24/132 R |
| 2,607,094 | 8/1952 | Nicosia | 24/132 R |
| 2,828,147 | 3/1958 | Peiffer | 24/136 R |
| 3,879,147 | 4/1975 | Morell | 24/115 M |
| 3,952,377 | 4/1976 | Morell | 24/136 R |
| 4,236,281 | 12/1980 | Bottum | 24/115 R |
| 4,333,649 | 6/1982 | Vaughn et al. | 24/115 M |
| 4,378,617 | 4/1983 | Burns | 24/137 R |

FOREIGN PATENT DOCUMENTS

| 999646 | 2/1952 | France | 24/136 R |
|---|---|---|---|
| 958284 | 5/1964 | United Kingdom | 24/115 M |

*Primary Examiner*—Victor N. Sakran
*Attorney, Agent, or Firm*—Head, Johnson & Stevenson

[57] ABSTRACT

A device for clamping together two lengths of rope such as a rope formed of braided plastic, the device having a pair of inner core members each having a mating inner surface so that when the members are positioned in engagement or adjacent to each other they provide an elongated core having a generally tapered truncated conical external surface having threads on the external surface. Each of the core members has a recess in the inner surface in the plane of the longitudinal axis so that two portions of a rope may be positioned between mated core members. An outer ring having a tapered opening therethrough is internally threaded so that when the outer ring is screwed onto the abutted core members it forces them together, clamping rope portions therebetween, the grooves formed in the abutting surfaces of the core members preferably have integral pointed spikes which penetrate the fibers of rope portions positioned between the core members to more securely hold the rope portions against slippage.

12 Claims, 7 Drawing Figures

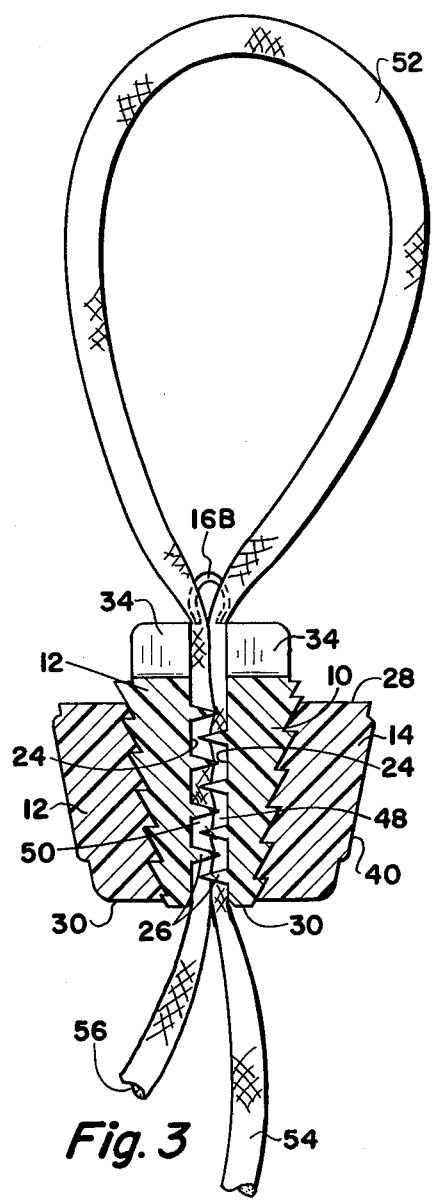
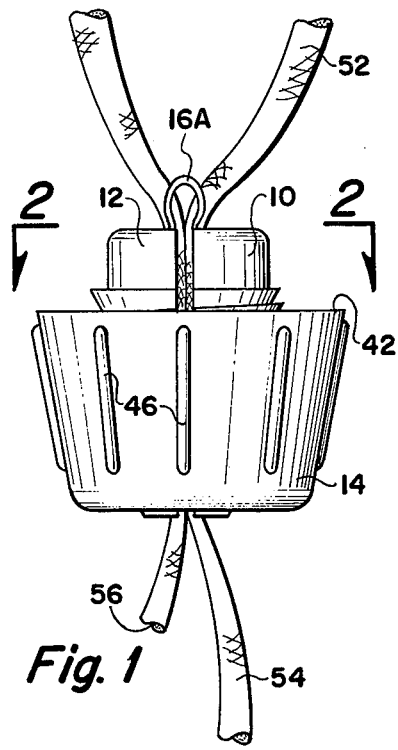
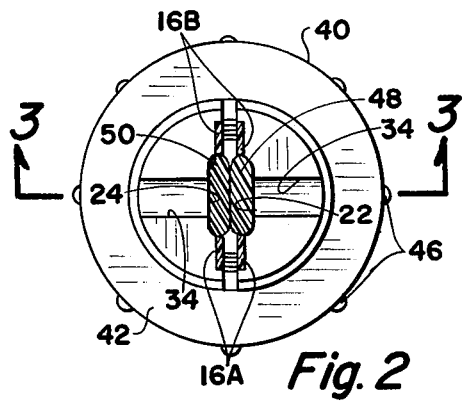

ROPE CLAMPING DEVICE

BRIEF SUMMARY OF THE INVENTION

A type of rope commonly used today is that which is made of braided plastic fibers. Plastic rope is very useful in that it is of light weight, is strong, and very flexible. Plastic also is resistant to deterioration in water and, therefore, plastic rope is frequently employed for water ski activities and for tying boats to a dock. One problem with braided plastic rope is that because it is so smooth and slick, it is difficult to tie knots in the rope which will not slip.

The present invention provides a simple and easy to use clamping device for clamping together two lengths of rope and is particularly adapted for clamping together two lengths of braided plastic rope. The device is formed of only three portions, that is, a pair of inner core members and an outer ring member. Each of the inner core members has a mating surface so that when the members are positioned in engagement with or adjacent to each other they provide an elongated core having a generally tapered, truncated, conical external surface providing a larger external diameter end and a smaller diameter end. Each of the core members has a recess in the inner mating surface in the plane of the longitudinal axis so that the mating core members provide a rope receiving opening therethrough when the members are positioned adjacent to each other. The external frusto-conical surfaces of the members have threads formed thereon, preferably of the modified buttress type. The recesses in each core member has integral rope engaging projections, and these projections preferably are in the form of pointed spikes which penetrate the fibers of rope portions without cutting the fibers.

The outer ring member has a tapered opening therethrough, the taper of the opening matching the taper of the external surfaces of the abutted inner core members. The tapered opening has threads which match the threads on the abutted core members and preferably is, as previously stated, of the modified buttress type. The external surface of the outer ring member is preferably irregular so as to facilitate hand tightening of the outer ring onto the abutted inner cores.

When two lengths of rope are positioned between the abutted inner cores and the ring member screwed onto them, the abutted inner cores are forced towards each other, clamping the rope therebetween. The pointed spikes penetrate the rope and securely hold it in position.

In one embodiment the inner core members may be cast in a single mold providing a thin, flexible, integral connecting web portion which keeps the two core members from being separated from each other but which readily permits them to be positioned in abutting relationship to receive rope portions therebetween.

BRIEF DESCRIPTION OF THE DRAWING

FIG. 1 is an elevational view of the device for clamping together two lengths of rope of this invention with the device in position for holding a length of rope doubled back on itself to produce a loop.

FIG. 2 is a top plan view taken along the line 2—2 of FIG. 1.

FIG. 3 is a cross-sectional view taken along 3—3 of FIG. 2.

FIG. 5 illustrates the appearance the core members might have as removed from a mold wherein the core members are cast integrally with the connecting web.

DETAILED DESCRIPTION

Figure 4:
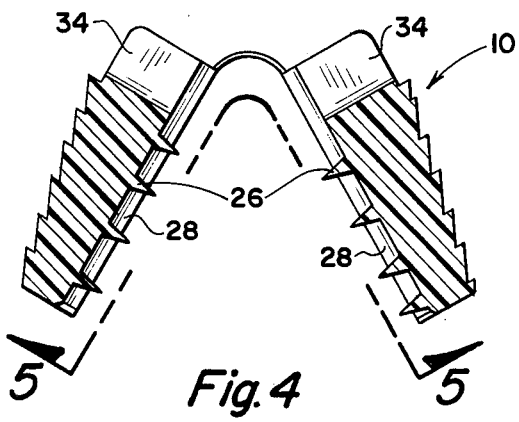
FIG. 4 is a cross-sectional view of the inner core members spread apart in position wherein they are ready to receive the ends of a length of rope therebetween.
Figure 5:
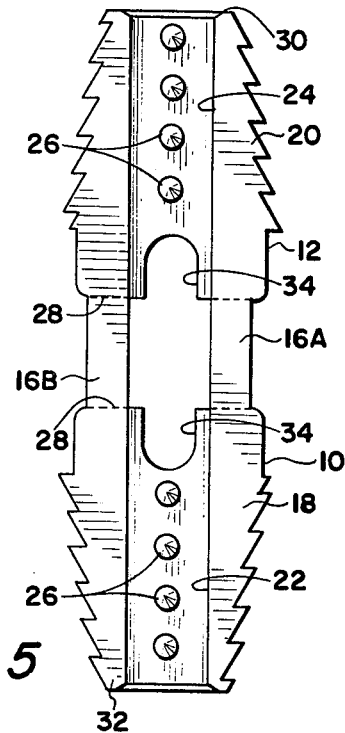
FIG. 5 is a view taken along the line 5—5 of FIG. 4 showing the inner surfaces of the core members and showing the connecting web which hingeably hold the core members together.
Figure 7:
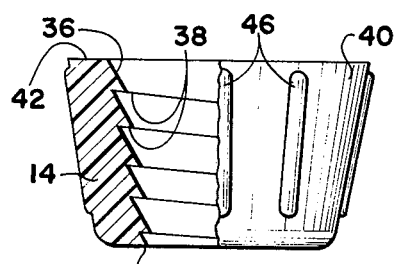
FIG. 7 is an elevational view of the outer ring member, shown partially cut away to reveal the cross-sectional configuration.

Referring first to FIG. 1, an external view of an embodiment of the invention is shown. The invention is formed by a pair of inner core members 10 and 12 and an outer ring member 14. The inner core members will be first described and are best seen with reference to FIGS. 4, 5, and 6. In a preferred arrangement the inner core members 10 and 12 are formed as one unitary device, that is, molded such as of plastic. However, they may also be made of metal, but plastic is highly preferred since it makes possible the simultaneous molding of an integral connecting web formed of strips 16A and 16B. The unitary device as it would appear when taken from a mold is shown in FIG. 5. The inner core member portions 10 and 12 have mating inner surfaces 18 and 20 respectively. In the illustrated arrangement the inner surfaces are basically flat. Inner surface 18 has a recess 22 which is in a plane of the longitudinal axis of the inner core member; and in like manner, the inner surface 20 has a recess 24.

Positioned within the recesses 22 and 24 are irregular surfaces to more securely engage ropes positioned within the recesses. In the illustrated arrangement, and a preferred arrangement, these irregularities are in the form of pointed spikes 26. The spikes 26 of core member 10 are out of register with the spikes 26 of core member 12; that is, when the core members are positioned so that the inner surfaces 18 and 20 are in abutment, or adjacent each other, such as shown in FIG. 6, the spikes 26 project between each other.

Figure 6:
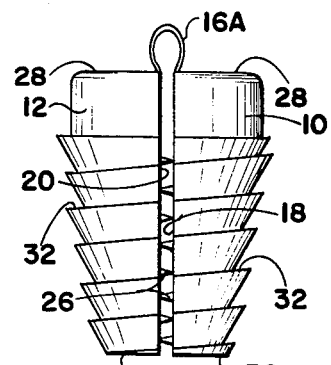
FIG. 6 is an external view of the core members with their mating surfaces adjacent each other in the position they assume when a rope (not shown) is positioned between the core members and ready to receive the outer ring member.

The inner core members are configured so that when the inner surfaces 18 and 20 are abutting or adjacent to each other as in FIG. 6, the external peripheral surface of the core members form a generally truncated conical configuration, that is, each of the core members has a larger diameter semi-circular end portion 28 and a smaller diameter semi-circular end portion 30. Formed on the tapered, truncated, conical peripheral surface of the abutted core members are threads 32 which are preferably in the form of the modified buttress type as illustrated.

Formed in the larger diameter end portions 28 of each of the inner core members 10 and 12 is a slot 34. This slot can be used for inserting a device, such as a screwdriver, to assist in tightening the outer ring member onto the inner cores, as will be described later.

The outer ring member is illustrated best in FIGS. 1, 2, 3, and 7. The outer ring member has a tapered opening through it which is provided with threads 38. The tapered opening conforms to the tapered or conical surface of the abutted inner core members, and the threads 38 are preferably of the modified buttress type so that the outer ring member may be threaded onto the abutted inner core members. By the provision of the tapered arrangement, the outer ring member may be slid onto the abutted inner core members until the inner surfaces engage, after which the outer ring member may be rotated to thread it onto the inner core member. Due to the tapered configuration, as the outer ring member is threaded towards the larger end 28 of the abutted inner core members, they are forced more securely together.

The outer ring member has preferably a frusto-conical outer surface 40 tapering from a larger diameter end 42 to a smaller diameter end 44. The outer surface 40 is provided with an irregular surface to increase the ability to apply torque as the outer ring member is threaded onto the inner core member. In the illustrated arrangement this is accomplished by the means of integral longitudinal outwardly extending boss portions 46.

To clamp two portions of a rope together, such as to form a loop in a rope or to attach two lengths of rope to each other, is easily accomplished by extending the two lengths of rope to be attached between the inner core members so that the ropes are received in the recesses 22 and 24. The inner core members are forced towards each other so that the inner surfaces 18 and 20 are adjacent to each other as shown in FIGS. 1 and 3. The pointed spikes 26 extend through the rope portions; and since they are sharp pointed, they will pass through the rope portions without cutting the strands of rope. With the inner core members in adjacent relationship, the outer ring member is positioned onto the inner cores. It is first slipped onto the exterior of the inner cores until the outer surfaces of the inner cores engage the inner surfaces of the tapered opening 36, after which the outer ring member is rotated relative to the inner core member to force the inner core members towards each other, clamping the rope therebetween.

In the arrangements illustrated in FIGS. 1, 2, and 3, rope portions 48 and 50 are received between the inner core members, and with the outer ring tightened the inner cores are locked together. This illustrates the formation of a loop 52 in a length of rope 54. One end 56 extends slightly beyond the locking member. In most cases, simple hand-tightening of the outer ring member relative to the inner core members is sufficient to hold the rope against slippage, and this can be accomplished without the use of tools of any kind. If more torque is to be applied, a holding device such as a screwdriver may be positioned in slot 34 in one of the core members so that more manual torque can be applied to the outer ring member 14 but if even greater tightening force is required, pliers or other gripping devices may be applied against the outer ring member. In most instances, the use of tools of any kind is not required.

The device makes it possible to clamp together two rope portions very expeditiously and much faster than a knot can be tied. In addition, the device holds much better than a knot; and when it is desired to remove the device, it can simply be unscrewed and taken off without damaging or kinking the rope as occurs when a tight knot is tied in a plastic rope.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A device for clamping together two lengths of rope, such as made of braided plastic, comprising:
    a pair of inner core members, each having a mating inner surface so that when the members are positioned in engagement with each other they provide an elongated core having a generally tapered, truncated conical external surface having a larger external diameter end and a smaller diameter end, each of the core members having a recess in the inner surface in the plane of the longitudinal axis so that the mated core members provide a rope receiving opening therethrough when the members are matingly joined, the external frustrated conical surfaces of the members having threads formed thereon, the recesses in each core member having integral rope engaging projections extending therefrom; and
    an outer ring member having a tapered opening therethrough, the taper of the opening matching the taper of the external surfaces of the said inner core members when abutted, the tapered opening having threads matching the threads of the abutted core members, said recess in said core member providing means to receive lengths of rope therein and said outer ring screwed onto said core members to force said core members towards each other to clamp rope therebetween.

2. A device for clamping together two lengths of rope according to claim 1 wherein said device is of generally frusto-conical external configuration having an irregular outer surface to facilitate manual rotation of the outer ring relative to said inner core members.

3. A device for clamping together two lengths of rope according to claim 1 wherein said threads on the exterior surfaces of said inner core members and said outer ring internal threads are of the modified buttress type.

4. A device for clamping together two lengths of rope according to claim 1 wherein said integral rope engaging projections extending from said core member recesses are in the form of pointed spikes, the spikes in one core member being out-of-register with the spikes in the other core member so that the spikes of one core member extend between the spikes of the other core member when the core members are matingly assembled, the spikes serving to penetrate the fibers of rope portions without cutting the rope fibers.

5. A device for clamping together two lengths of rope according to claim 1 wherein said pair of inner core members have an integral, flexible connecting web portion extending from the larger diameter ends flexibly connecting the core members to each other.

6. A device for clamping together two lengths of rope according to claim 1 wherein each of said core members has a slot in the larger diameter end, each slot providing means to receive a torque imparting tool, such as a screwdriver or the like, to resist the rotation of the inner core members when said outer ring is threaded onto or off of the abutted core members.

7. A device for clamping together two lengths of rope, comprising:

a pair of core members, each having a mating inner surface so that when the members are positioned in engagement with each other they provide an elongated core having a generally tapered, truncated conical external surface having a larger external diameter end and a smaller diameter end, the mated core members providing a rope receiving means therebetween when the members are matingly juxtaposed, the external frustrated conical surfaces of the members having threads formed thereon, the inner surfaces of said core members being configured to provide rope engaging means; and an outer ring member having a tapered opening therethrough, the taper of the opening matching the taper of the external surfaces of the said inner core members when abutted, the tapered opening having threads matching the threads of the abutted core members, said core members providing means to receive lengths of rope therebetween and said outer ring screwed onto said core members to force said core members towards each other to clamp rope therebetween.

8. A device for clamping together two lengths of rope according to claim 7 wherein said rope engaging means on said core members inner surfaces includes the arrangement wherein at least one of the core members has an irregular inner surface.

9. A device for clamping together two lengths of rope according to claim 7 wherein said rope engaging means on said core members inner surfaces are in the form of pointed spikes integrally formed with and extending from at least one of said inner surfaces.

10. A device for clamping together two lengths of rope according to claim 7 wherein said threads on the exterior surfaces of said inner core members and said outer ring internal threads are of the modified buttress type.

11. A device for clamping together two lengths of rope according to claim 7 wherein said rope engaging means is in the form of projections extending from said core member inner surfaces, the projections being in the form of pointed spikes, the spikes in one core member being out-of-register with the spikes in the other core member so that the spikes of one core member extend between the spikes of the other core member when the core members are matingly assembled, the spikes serving to penetrate the rope portions without cutting the rope portions.

12. A device for clamping together two lengths of rope according to claim 7 wherein said pair of inner core members have an integral, flexible connecting web portion extending from the larger diameter ends flexibly connecting the core members to each other.

* * * * *